US008624892B2

(12) United States Patent
Feth et al.

(10) Patent No.: US 8,624,892 B2
(45) Date of Patent: Jan. 7, 2014

(54) INTEGRATION OF GRAPHICAL APPLICATION CONTENT INTO THE GRAPHICAL SCENE OF ANOTHER APPLICATION

(71) Applicant: RPX Corporation, San Francisco, CA (US)

(72) Inventors: William J. Feth, San Jose, CA (US); David William Hughes, Oxon (GB); Michael Boccara, Sfar Saba (IL)

(73) Assignee: RPX Corporation, San Francisco, CA (US)

( * ) Notice: Subject to any disclaimer, the term of this patent is extended or adjusted under 35 U.S.C. 154(b) by 0 days.

(21) Appl. No.: 13/677,920

(22) Filed: Nov. 15, 2012

(65) Prior Publication Data

US 2013/0069963 A1    Mar. 21, 2013

Related U.S. Application Data

(63) Continuation of application No. 12/987,615, filed on Jan. 10, 2011, which is a continuation of application No. 11/368,451, filed on Mar. 7, 2006, now Pat. No. 7,868,893.

(51) Int. Cl.
*G06T 15/00* (2011.01)
(52) U.S. Cl.
USPC ............ 345/419; 345/422; 345/426; 345/522
(58) Field of Classification Search
None
See application file for complete search history.

(56) References Cited

U.S. PATENT DOCUMENTS

| | | |
|---|---|---|
| 5,491,813 A | 2/1996 | Bondy et al. |
| 5,682,326 A | 10/1997 | Klingler et al. |
| 5,774,720 A | 6/1998 | Borgendale et al. |
| 5,838,326 A | 11/1998 | Card et al. |
| 5,889,951 A | 3/1999 | Lombardi |
| 6,002,403 A | 12/1999 | Sugiyama et al. |
| 6,088,032 A | 7/2000 | Mackinlay |
| 6,229,542 B1 | 5/2001 | Miller |
| 6,417,849 B2 | 7/2002 | Lefebvre et al. |
| 6,538,660 B1 | 3/2003 | Celi, Jr. et al. |
| 6,597,358 B2 | 7/2003 | Miller |
| 6,721,950 B1 | 4/2004 | Lupu |
| 6,774,919 B2 | 8/2004 | Miller et al. |
| 6,909,443 B1 | 6/2005 | Robertson et al. |

(Continued)

OTHER PUBLICATIONS

Billinghurst, Mark, et al. "Mixing realities in shared space: An augmented reality interface for collaborative computing." Multimedia and Expo, 2000. ICME 2000. 2000 IEEE International Conference on. vol. 3. IEEE, 2000.*

(Continued)

*Primary Examiner* — Hau Nguyen
*Assistant Examiner* — Ryan M Gray
(74) *Attorney, Agent, or Firm* — Howison & Arnott, L.L.P.

(57) ABSTRACT

This application describes a system that captures 3D geometry commands from a first 3D graphics process and stores them in a shared memory. A second 3D environment process creates a 3D display environment using a display and display hardware. A third process obtains the 3D commands and supplies them to the hardware to place 3D objects in the 3D environment. The result is a fused display environment where 3D objects are displayed along with other display elements. Input events in the environment are analyzed and mapped to the 3D graphics process or the environment where they affect corresponding processing.

19 Claims, 15 Drawing Sheets

(56) References Cited

U.S. PATENT DOCUMENTS

| | | |
|---|---|---|
| 6,919,891 B2 | 7/2005 | Schneider et al. |
| 7,064,766 B2 | 6/2006 | Beda et al. |
| 7,119,819 B1 | 10/2006 | Robertson et al. |
| 7,170,510 B2 | 1/2007 | Kawahara et al. |
| 7,170,526 B1 | 1/2007 | Johnson |
| 7,215,335 B2 | 5/2007 | Matsumoto et al. |
| 7,218,319 B2 | 5/2007 | Matsumoto et al. |
| 7,245,310 B2 | 7/2007 | Kawahara et al. |
| 7,277,572 B2 * | 10/2007 | MacInnes et al. ............ 382/154 |
| 7,290,216 B1 | 10/2007 | Kawahara et al. |
| 7,400,322 B1 | 7/2008 | Urbach |
| 7,432,934 B2 | 10/2008 | Salazar et al. |
| 7,443,401 B2 | 10/2008 | Blanco et al. |
| 7,480,873 B2 | 1/2009 | Kawahara |
| 7,487,463 B2 | 2/2009 | Johnson |
| 7,631,277 B1 | 12/2009 | Nie et al. |
| 7,685,534 B2 | 3/2010 | Kamen et al. |
| 7,773,085 B2 | 8/2010 | Hughes |
| 7,774,430 B2 | 8/2010 | Hughes |
| 7,868,893 B2 | 1/2011 | Feth et al. |
| 8,042,094 B2 | 10/2011 | Napoli et al. |
| 2001/0040571 A1 | 11/2001 | Miller |
| 2002/0154214 A1 | 10/2002 | Scallie et al. |
| 2004/0085310 A1 * | 5/2004 | Snuffer ........................ 345/419 |
| 2004/0135974 A1 | 7/2004 | Favalora et al. |
| 2004/0148221 A1 | 7/2004 | Chu |
| 2004/0174367 A1 | 9/2004 | Liao |
| 2004/0179262 A1 | 9/2004 | Harman et al. |
| 2004/0212589 A1 | 10/2004 | Hall et al. |
| 2005/0041736 A1 | 2/2005 | Butler-Smith et al. |
| 2005/0081161 A1 | 4/2005 | MacInnes et al. |
| 2005/0086612 A1 | 4/2005 | Gettman et al. |
| 2005/0149251 A1 | 7/2005 | Donath et al. |
| 2005/0179691 A1 | 8/2005 | Johnson |
| 2005/0179703 A1 | 8/2005 | Johnson |
| 2005/0182844 A1 | 8/2005 | Johnson et al. |
| 2005/0204306 A1 | 9/2005 | Kawahara et al. |
| 2005/0253840 A1 | 11/2005 | Kwon |
| 2005/0281276 A1 | 12/2005 | West et al. |
| 2006/0028479 A1 | 2/2006 | Chun et al. |
| 2006/0129634 A1 | 6/2006 | Khouzam et al. |
| 2007/0043550 A1 | 2/2007 | Tzruya |
| 2007/0070066 A1 | 3/2007 | Bakhash |
| 2007/0124382 A1 | 5/2007 | Hughes |
| 2007/0171222 A1 | 7/2007 | Kowalski |
| 2011/0022677 A1 | 1/2011 | Hughes |

OTHER PUBLICATIONS

Mohr, Alex, and Michael Gleicher. "HijackGL: reconstructing from streams for stylized rendering." Proceedings of the 2nd international symposium on Non-photorealistic animation and rendering. ACM, 2002.*

OpenGL Programming Guide, www.glprogramming.com/red/chapter03.html, Captured Nov. 19, 2005.*

Pan, Zhigeng, Xiaochao Wei, and Jian Yang. "Geometric model reconstruction from streams of DirectX 3D game application." Proceedings of the 2005 ACM SIGCHI International Conference on Advances in computer entertainment technology. ACM, 2005.*

Reitmayr, Gerhard, Mark Billinghurst, and Dieter Schmalstieg. "WireAR-legacy applications in augmented reality." Mixed and Augmented Reality, 2003. Proceedings. The Second IEEE and ACM International Symposium on. IEEE, 2003.*

International Preliminary Report on Patentability, mailed Sep. 18, 2008 and issued in corresponding International Patent Application No. PCT/US2007/005715, 5 pages.

International Preliminary Report on Patentability, mailed Sep. 18, 2008 and issued in corresponding International Patent Application No. PCT/US2007/005716, 4 pages.

International Preliminary Report on Patentability, mailed Sep. 18, 2008 and issued in corresponding International Patent Application No. PCT/US2007/005717, 5 pages PCT International Search Report, mailed Mar. 5, 2008 and issued in related International Patent Application No. PCT/US2007/05715, 2 pages.

PCT International Search Report, mailed Mar. 6, 2008 and issued in related International Patent Application No. PCT/US2007/05717, 2 pages.

PCT International Search Report, mailed May 8, 2008 and issued in related International Patent Application No. PCT/US2007/05716, 2 pages.

* cited by examiner

INTEGRATION OF GRAPHICAL APPLICATION CONTENT INTO THE GRAPHICAL SCENE OF ANOTHER APPLICATION

BACKGROUND OF THE INVENTION

1. Field of the Invention

The present invention is directed to a system that integrates the graphical content from one application into the graphical scene of another application and particularly a system that extracts the 3D objects and materials that make up the images generated by a first application from its graphics data stream and fuses them into the second application.

2. Description of the Related Art

Customers often have many forms of related data ingested and presented by separate applications in separate windows, and even on separate computers in separate locations. For example, in the automotive industry, aerodynamics and crash analysis for a single car might be done using separate data sources and be analyzed in separate applications. If these analyses could be more integrated, it would speed up the decision cycle. In practice there may be many more than two data streams or two applications. This problem becomes even more difficult when the data streams represent 3D information.

What is needed is a system that can integrate the view of these stovepipe applications and particularly when three-dimensional (3D) displays are involved.

SUMMARY OF THE INVENTION

It is an aspect of the embodiments discussed herein to provide a system that extracts from one application its 3D objects and materials, which may either comprised of pixel data or 3D geometry and other graphics library definition data, such as textures, colors, surface materials, animations, vertex programs, shading algorithms, etc., and fuses them into another application.

It is also an aspect of the embodiments to receive user input device events from the fusion environment, modify them as needed to correspond to user input events expected by the graphics source application and supply them to the graphics source application.

A further aspect of this invention is that an unmodified graphics application may serve as the source of the graphics data or as the target of the graphics data. Furthermore, an unmodified graphics application may serve as the target of user input events or as the source of user input events. That is, a given graphics application may act as the sender or receiver of graphics and input information without any modification to the code of the application, although the application does not need to be unmodified to perform in either capacity.

The above aspects can be attained by a system that captures 3D graphics library commands including 3D geometry from a first application or the color and depth imagery produced by a first application and supplies them to a second application. In the second application the 3D objects are combined into a scene that may include display elements from other applications. The result is a fused display environment where 3D objects are displayed along with other display elements, such as flat windows, each 3D object or display element potentially coming from a different source application. Input events in the fused environment are analyzed and mapped to the first application where they affect the processing of the first application. In order to supply graphic information from an application to the other, the system may go through an intermediary stage if placing the graphic stream data in a memory that is shared between the two applications, using the operating system's shared memory or using a network protocol. This step actually allows more than two applications to access the graphic stream at the same time, allowing therefore collaboration between the users of the various applications.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Integration of graphical application content into the graphical scene of another application or media fusion can solve the general problem of "stovepipe applications". Using various hardware and software sources of visual input, an integration system ingests, combines ("fuses"), and distributes various types of media streams (e.g. streams of pixels, polygons, user input events), which originate from various sources (e.g. 3D applications, remote desktops/PCs, video recordings, even other media fusion sessions). The system then "fuses" and displays the media streams side-by-side, superimposed, or combined in any number of other ways. Such a fusion session can also be recorded for later playback or visually served out for remote interaction and collaboration. Visual serving is the ability to stream in real time a view of a graphics application over a network with control passed back to the source application from the remote client.

The current Integration of graphical application content into the graphical scene of another application, using video-input cards and Vizserver™ visual serving technology, brings disparate applications into a common environment. However, the output of these applications (models, drawings, statistics, etc.) is still contained within flat windows.

The embodiments of the present invention allow full integration of the application's 3D data content into an integrated 3D landscape. This can be accomplished by intercepting an application's graphics data at any point in the graphics pipeline, which includes the creation and processing of graphical objects, conversion to a raster (pixel) form, and finally the creation of video image on a display surface. For example, near the end of the pipeline the system can extract depth values for every pixel of the application's video output and represent each pixel at a corresponding depth in the media fusion scene (instead of as a fiat 2D window in the media fusion scene). Alternatively, the system can extract the geometric primitives from the application at some point prior to its image generation (e.g. before they are sent to the graphics hardware), and insert the application's 3D objects directly into the 3D Media Fusion scene. These methods provide an improved way to comprehend and interact with applications' data. For example, instead of two 3D graphics applications displaying their visual output within two separate flat windows, possibly on separate computer systems and displays, the 3D data of the two applications is extracted and visually combined ("fused") into a common 3D scene such that the data may mutually intersect or occlude each other. An extension of this is that the displayed data may be some derivative of multiple captured streams, for example the sum or difference of two streams of data.

Figure 1:
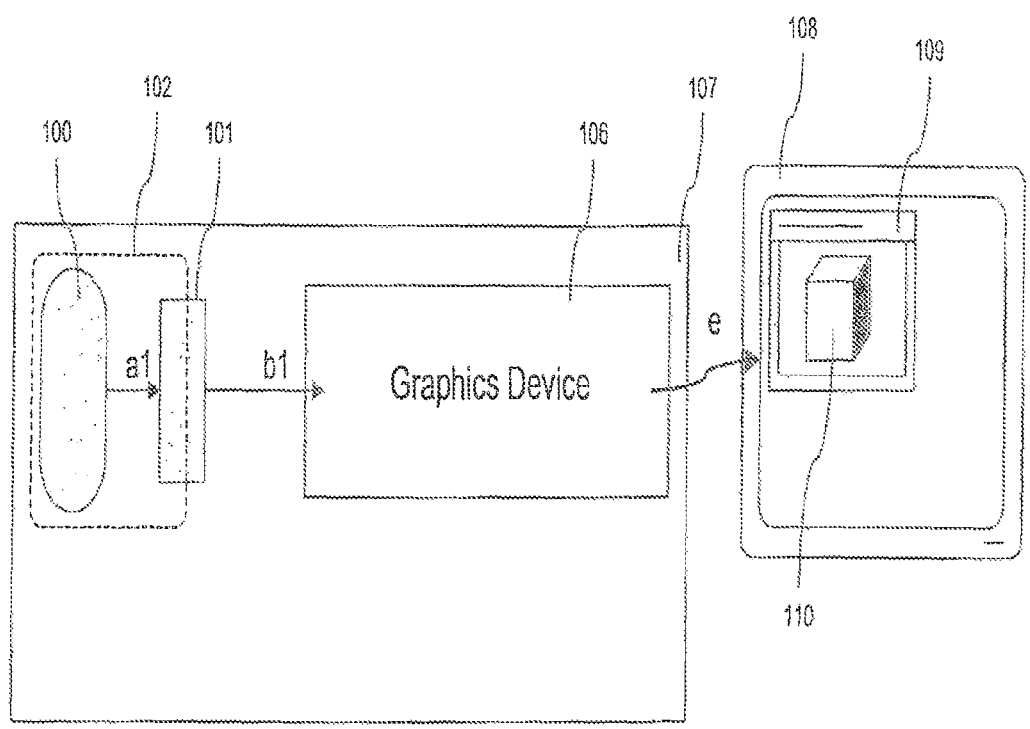
FIG. 1 illustrates a typical process by which a computer graphics program generates an image on a computer display.

FIG. 1 illustrates a normal process by which a computer graphics program 100 of a computer system 107 generates a live image on computer display 108 using modern computer graphics hardware 106. Subsequent figures show a process by which the graphics commands of the graphics program may be captured for the purpose of storing them, modifying them, or transmitting them to other software programs. This is done without modifying the code of the originating graphics program. The originating graphics program is unaware that its graphics commands are being captured and manipulated.

Normally, a computer graphics program 100 utilizes standard graphics software libraries 101, such as an OpenGL library, to command computer graphics hardware 106 to form an image 110 in the program's window 109 on the computer display 108. The logic of the graphics program executes as a computer process 102. The process 102 invokes a sequence, or stream, of graphics commands a1 that are interpreted by the computer graphics library 101, namely the OpenGL library, and converted into hardware-specific graphics commands b1.

Figure 2:
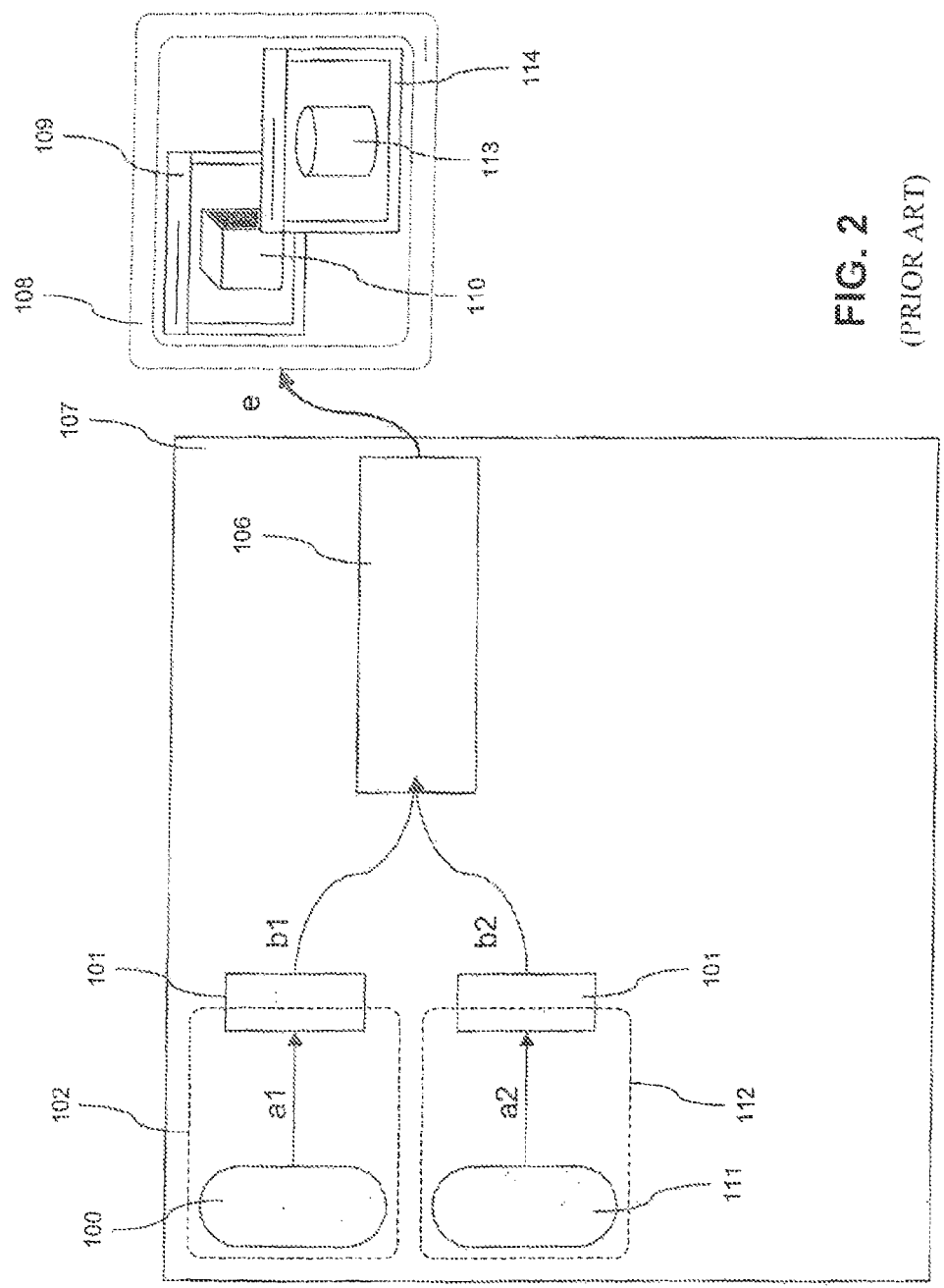
FIG. 2 shows a process by which two computer graphics programs generate images on a computer display.

FIG. 2 shows the normal process by which two computer graphics programs 100 and 111 generate live images on computer display 108 using modern computer graphics hardware 106. Normally, two computer graphics programs 100 and 111 (with process 112) utilize standard graphics software libraries 101, such as the OpenGL library, to command computer graphics hardware 106 to form images 110 and 113 in windows 109 and 114 respectively, on a computer display 108. The graphics software library 101 accepts both command streams a1 and a2 and, while keeping the contents of the streams separate, it sends them both to the graphics pipe as two intact streams, b1 and b2, destined for separate regions of the output video signal, e.

Figure 3:
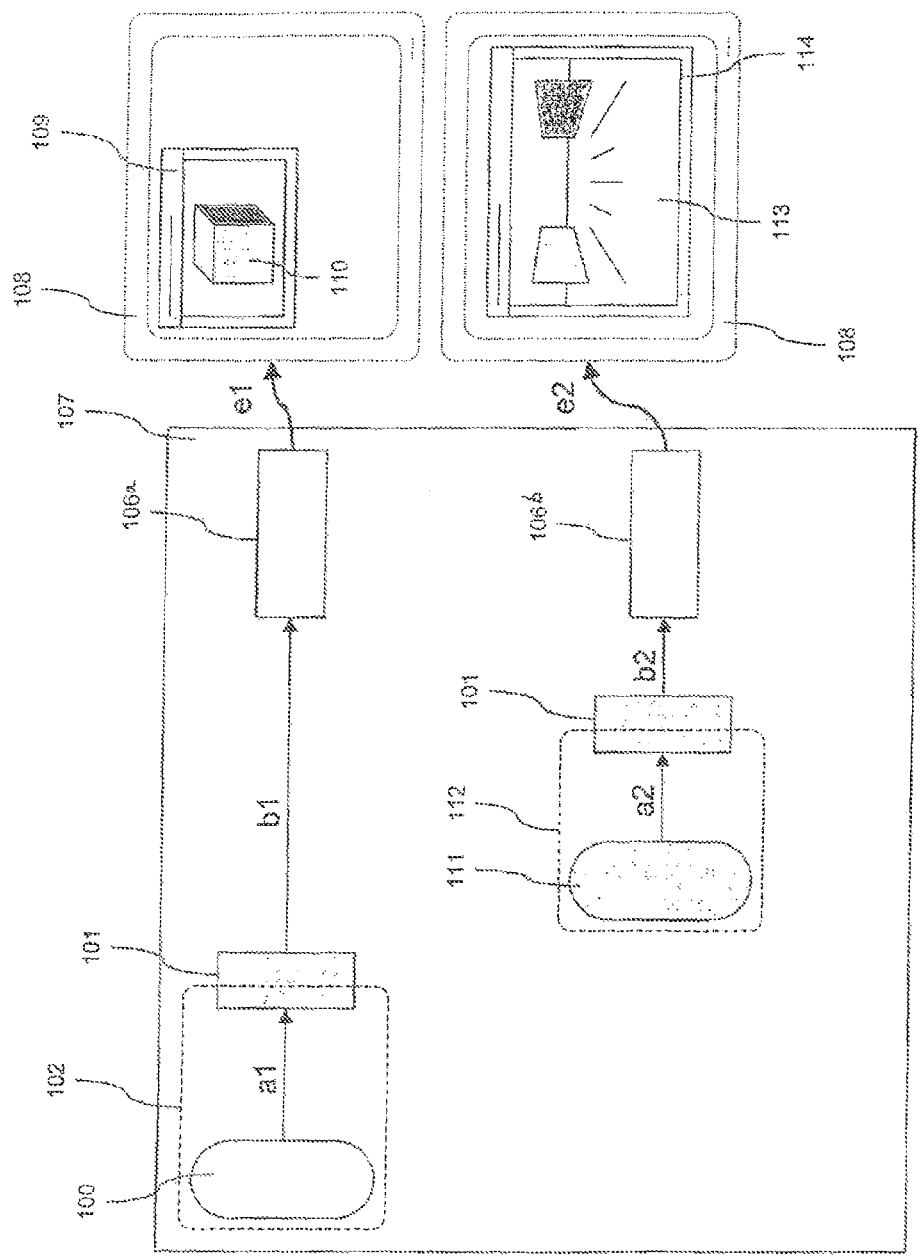
FIG. 3 the process of FIG. 2 using two hardware graphics accelerators.

FIG. 3 illustrates the normal process by which two computer graphics programs 100 and 111 generate live images on a computer display using two hardware graphics accelerators 106a and 106b. This diagram shows the two graphics programs 100 and 111 utilizing the two graphics hardware accelerators 106a and 106b to draw their data onto two separate computer monitors 108a and 108b. In this case the OpenGL scene 113 drawn by the second graphics application program is a media fusion environment. Since each hardware graphics accelerator has its own graphics pipeline, each generates its own video signal, e1 and e2.

Figure 4:
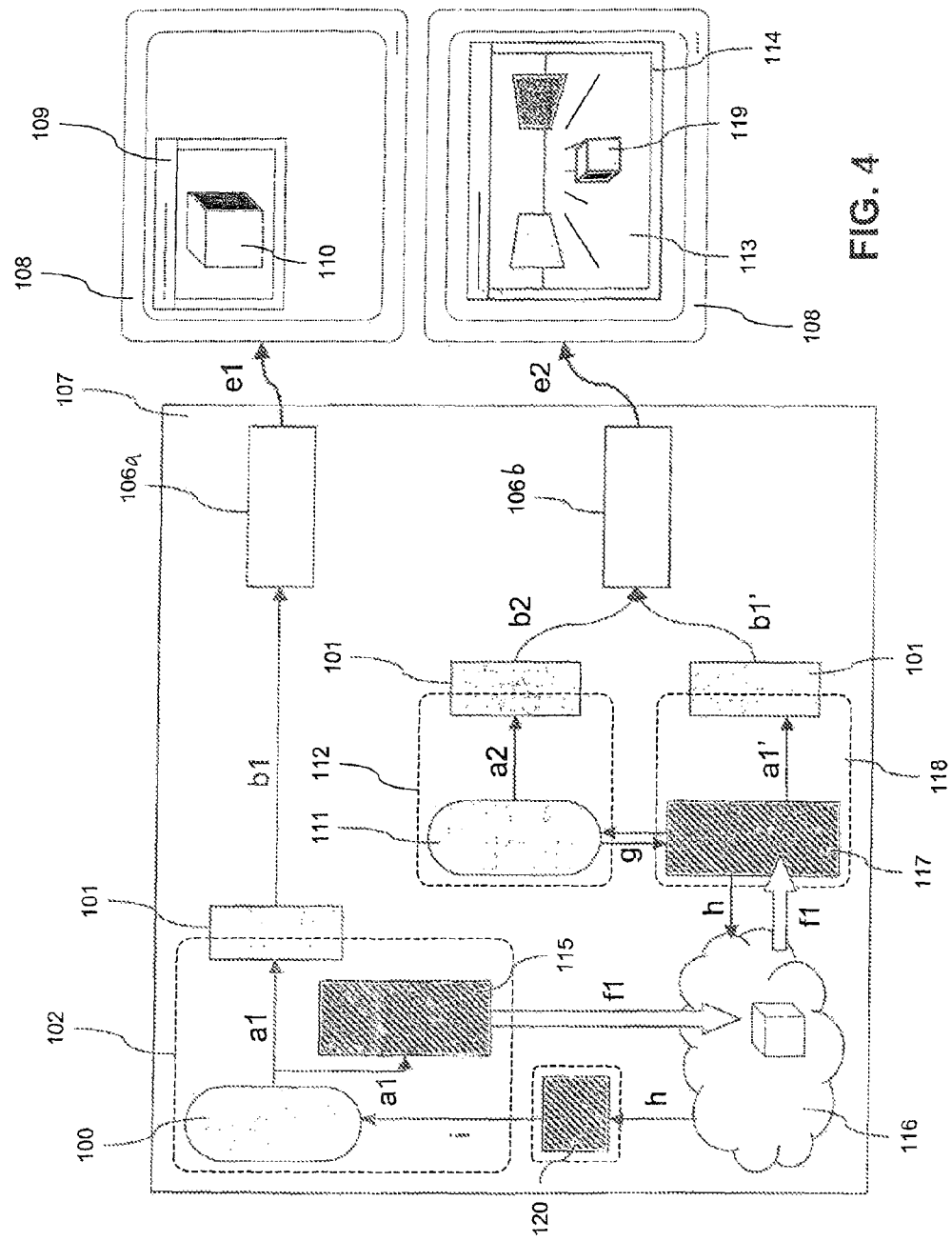
FIG. 4 shows capturing 3D graphics commands and transferring them to another application.

FIG. 4 shows a process by which the graphics commands of one graphics program may be captured for the purpose of storing them, modifying them, or communicating them to other software programs. Furthermore, the diagram shows a method for inserting the captured graphics commands into the 3D scene (into the command stream) of another graphics program. This is done without modifying the code of the originating graphics program. The originating graphics program is unaware that its graphics commands are being captured and manipulated.

This embodiment captures the computer graphics commands a1 of a 3D graphics program 100 and later integrates these commands with the commands a2 of another computer graphics program 111, so that the visual output of both programs is combined, in reality or in appearance only, into a single 3D scene that looks and behaves as if only one graphics program had generated it. More generally, the graphics pipeline may be "tapped into" at any point between a1 and e inclusive, not just at its end points (at command generation, pre-rasterization, or post-rasterization).

First, intercept software 115, typically in the form of a software library, is loaded into the computer process 102 of the first graphics program 100. The intercept software 115 converts the graphics program's 3D graphics commands a1 into a format f1 that can be readily transmitted to other processes. This process is typically called serialization, or encoding, or packing. It is commonly performed on 3D graphics commands by software packages such as OpenGL Multipipe, as sold by Silicon Graphics, Inc., or Chromium, created by Stanford University. Preferably, this takes place application-transparently; that is, without modification of code in graphics program 100. Graphics program 100 is unaware that a copy of its graphics commands is being made. In their readily transmittable format f1 the graphics commands can be stored on some permanent storage device for later retrieval, transmitted over a network, or more preferably, placed in shared memory 112 that is shared between processes.

In FIG. 4, graphics program 111 generates the 3D media fusion environment 113 into which we wish to insert the graphics output of the first graphics program 100.

Computer process 118 contains a program 117 that reads the commands f1 out of shared memory 116. Program 117 draws these graphics commands into the window of graphics program scene 113. To do this, the two programs communicate about information in the graphics command stream f1 that needs to be modified on the fly to be integrated into the scene 113, of graphics program 111. Such modifications include correlating the 3D coordinate systems and scene lighting of the two streams, and other visual effects that may require changes to stream f1 to visually integrate the result 119 of graphics commands a1' into the 3D scene 113, that is produced by graphics commands a2. Notice, for example, the difference in orientation and illumination of 3D object 110 when drawn by first graphics program 100, and after it is modified and drawn as an object 119 as part of the 3D scene 113 of the second graphics program 111. Additional detailed are provided with respect to FIGS. 9, 10, and 11 for the modifications to the OpenGL command stream to reconcile the 3D coordinate systems of the two applications.

Depending on implementation, programs 111 and 117 may be combined into a single program (that is a single thread of execution), a single process with separate threads of execution, or as pictured, in two separate processes 112 and 118 each with its own thread of execution 111 and 117. Depending on the implementation, therefore, programs 111 and 117 may produce a single combined graphics command stream, a2+a1 or as depicted here, they may produce separate graphics streams that are later only visually merged into b2+b1' by the graphics library 101. Each of these implementation alternatives has its set of advantages and drawbacks that will be readily apparent to those skilled in the art.

The difference between the combining of graphics command streams b1 and b2 of the two programs in FIG. 2 and the combining of streams b2 and b1' in this FIG. 4 are: A. In FIG. 4, programs 111 and 117 coordinate their graphics commands (communicating via g). B. In FIG. 2, graphics programs 100 and 111 draw their 3D scenes into two separate windows 109 and 114, on the same monitor. In FIG. 4, both graphics programs 111 and 117, draw their 3D scenes into the same window 114, so the drawn outputs 113 and 119 appear as if drawn by a single program into a single window.

Not only do graphics commands travel from the originating graphics program 100 to the window of the receiving graphics program 111 but some user input (keyboard and mouse) commands, received in the normal way by graphics program 111, also need to be passed back to the originating graphics program 100. To fully create the appearance of a single scene produced by a single graphics program, the user is allowed to manipulate and control the inserted 3D object or 3D scene 119, just as he would any other object in the 3D scene of graphics program 111: Control needs to be as seamless as if he was controlling the object in its original window 109. Input events h are transformed from the 3D scene ("world space") back into the 2D coordinate system of the original application's window. Depending on implementation, input event transformation may be handled in whole or in part by any of graphics programs 111 or 117. A transformed event is decoded by input decoder process 120 and passed as a decoded event i from shared memory 116 back to application 100, often via a regular window server (e.g. an X Window Server).

Figure 5:
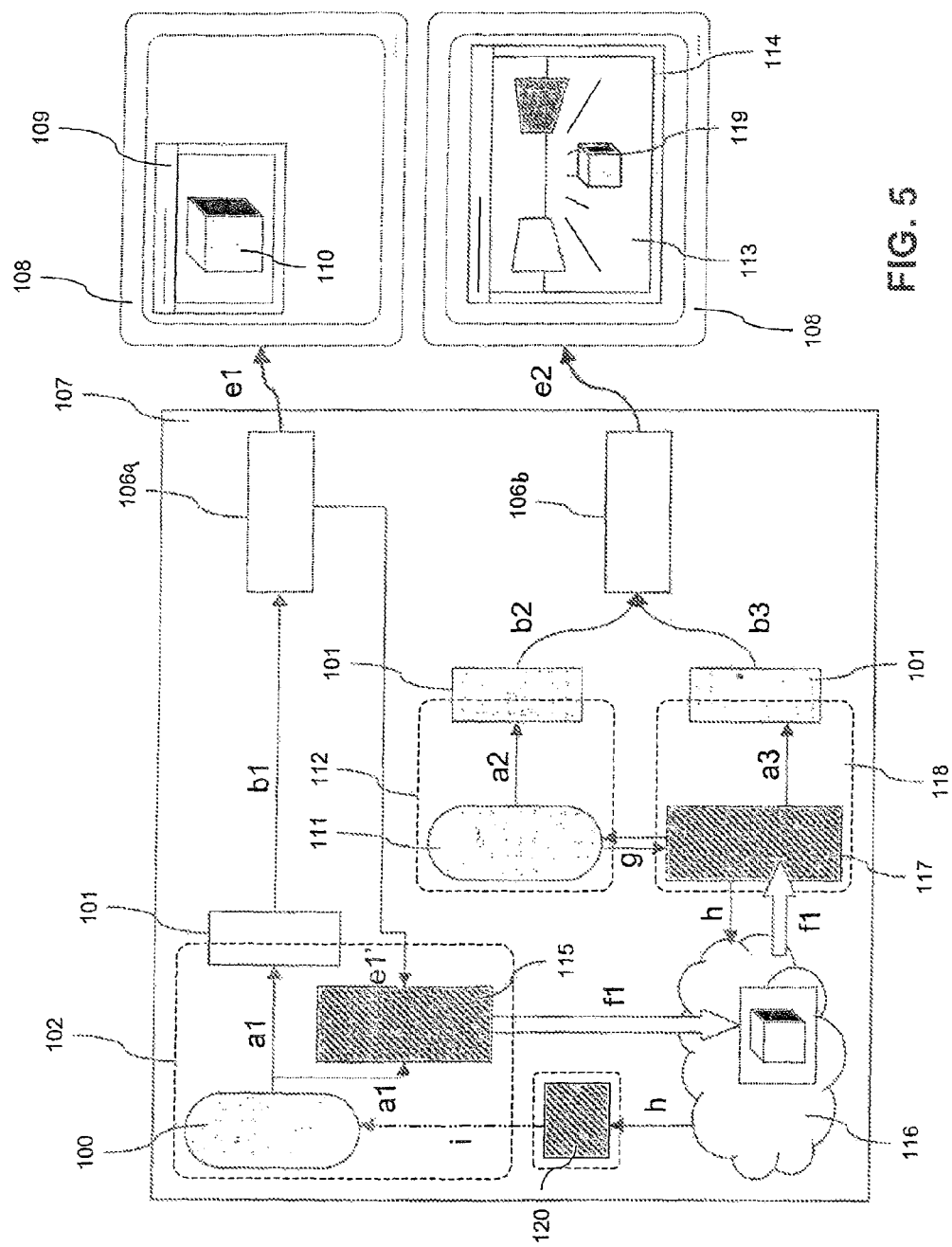
FIG. 5 shows the capturing of color and depth imagery and transferring them to another application.

FIG. 5 shows a process by which depth and color values of the 3D output of one graphics program, rather than its graphics commands, may be captured for the purpose of storing them, modifying them, or communicating them to other software programs. Furthermore, the diagram shows a method for fusing the captured "video+depth" information into the 3D scene of another graphics program. This is done without modifying the code of the originating graphics program. The originating graphics program is unaware that its graphics output is being captured and manipulated.

Unlike the embodiment of FIG. 4, which captures the computer graphics commands a1 of a first 3D graphics program 100 before they are sent to graphics hardware 106, the embodiment of FIG. 5 captures the fully drawn video output produced by graphics hardware e1 as well as a depth image of each video image to make e1': a stream of 2D graphics output+depth. The 2D graphics output+depth is later used to make graphics commands a3, which are merged with the graphics commands a2 of a second computer graphics program 111, so that the visual output of both programs is combined, in reality or in appearance only, into a single 3D scene that looks and behaves as if only one graphics program had generated it.

In this embodiment, graphics intercept library 115 listens for certain "trigger" graphics commands, such as "glXSwapBuffers" commands, rather than capturing all graphics commands. This is so the intercept library can determine when it should retrieve a fully drawn image from a video buffer on the graphics hardware. Imagery may be retrieved from the graphics hardware using common graphics readback or video recording techniques such as those used in the Vizserver collaboration software as sold by Silicon Graphics, Inc. In addition to the normal "color image" that can be read back from the graphics hardware, this embodiment also retrieves a "depth image". The pixels in a depth image indicate the 3D positions of their corresponding pixels in the color image. Intercept library 115 stores the combined color and depth imagery e1' in shared memory 116, possibly in an efficient, encoded format, f1.

Graphics program 117 in this embodiment reads color and depth imagery f1 out of shared memory 116, then it constructs a 3D object from the depth image and applies the color image onto the surface of the object. The program may make automated or semi-automated modifications to f1, for example, to allow for parts of the imagery to be "cut out", such as the background of the image: As before, when program 117 communicates with graphics program 111 to map 3D coordinate systems and other visual effects of the first graphics application to that of the second graphics application, it may require changes to stream f1. Then, it executes graphics commands a3, which produce a visually composited image 119 in the 3D scene 113 that is produced by graphics commands a2. Notice in this embodiment that the orientation and illumination of 119 is the same as in the original image 110 since it was derived from the imagery e1' of the first application, rather than the 3D commands a1 that were used to generate image 110. While it is possible to alter image 119 so that it looks correct from various viewpoints, this embodiment provides less flexibility between the viewpoints of applications 100 and 111 than the embodiment of FIG. 4.

User inputs are handled in the same manner as in the previous embodiment.

Figure 6:
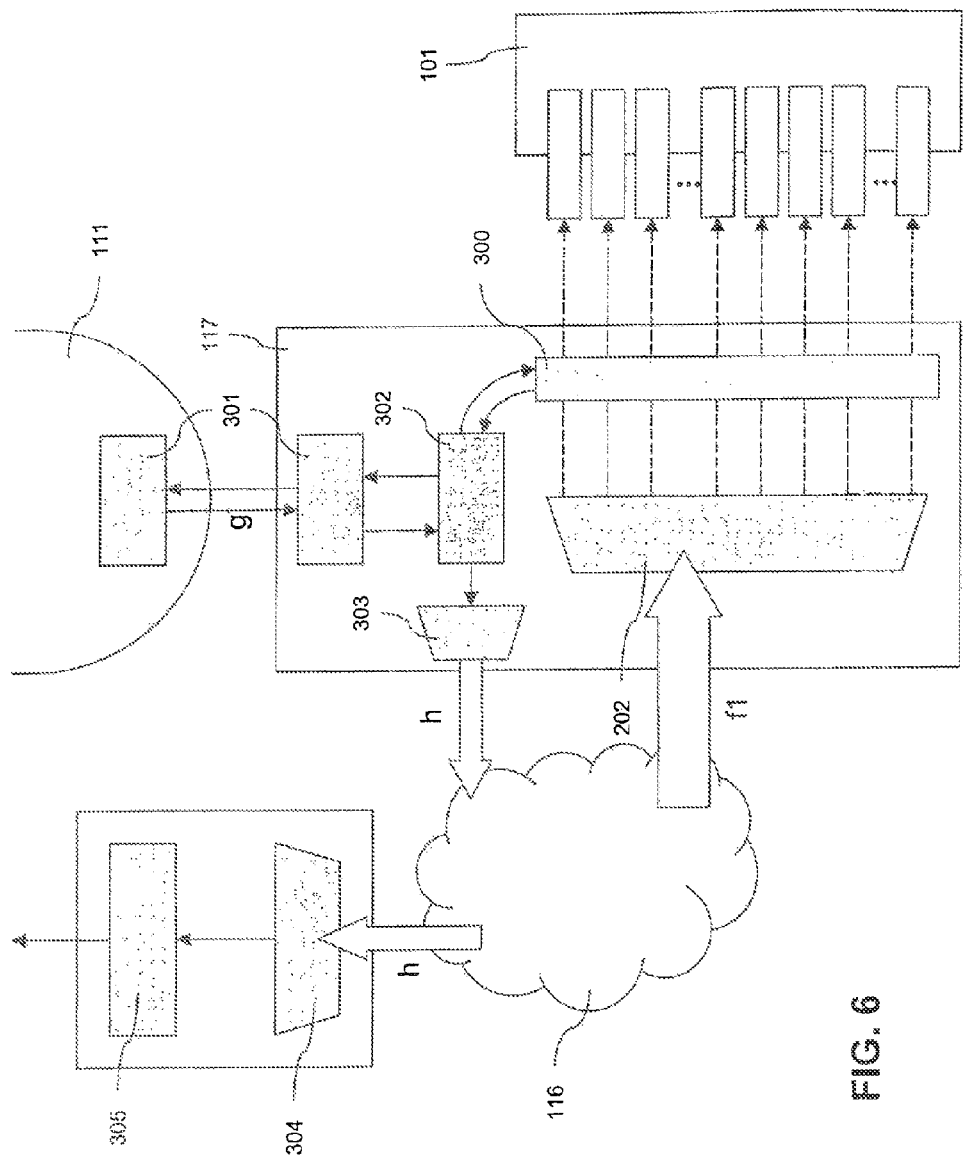
FIG. 6 shows another approach to capturing and processing function calls and environment inputs.

FIG. 6 illustrates in detail the process of decoding from a shared memory the stream of OpenGL graphics commands from a remote application. The remote commands arrive in stream f1 and are decoded by decoder 202. These calls are passed to a modification step 300 where the OpenGL function calls may be modified here before they are sent to the graphics library/driver 101. Process 302 provides input to the modification process for controlling orientation and pose of objects in f1 and input events h from the media fusion environment 111. Remote procedure call (RPC) facilities 301 are provided for communication between two drawing processes 111 and 117 for information, such as user input device events, graphics context switches, other points of synchronization. The input encoder 303 places filtered/application-window-relative input events h from the environment into shared memory 116. An input decoder 304 decodes the input events obtained from shared memory 116. The input event process 305 acts as a proxy for the user of the fusion environment. It sends artificial input events to an X Window System Server and/or to the graphics application 102 so that the application 102 receives the input events in the normal way—if a normal user had supplied them.

Figure 7:
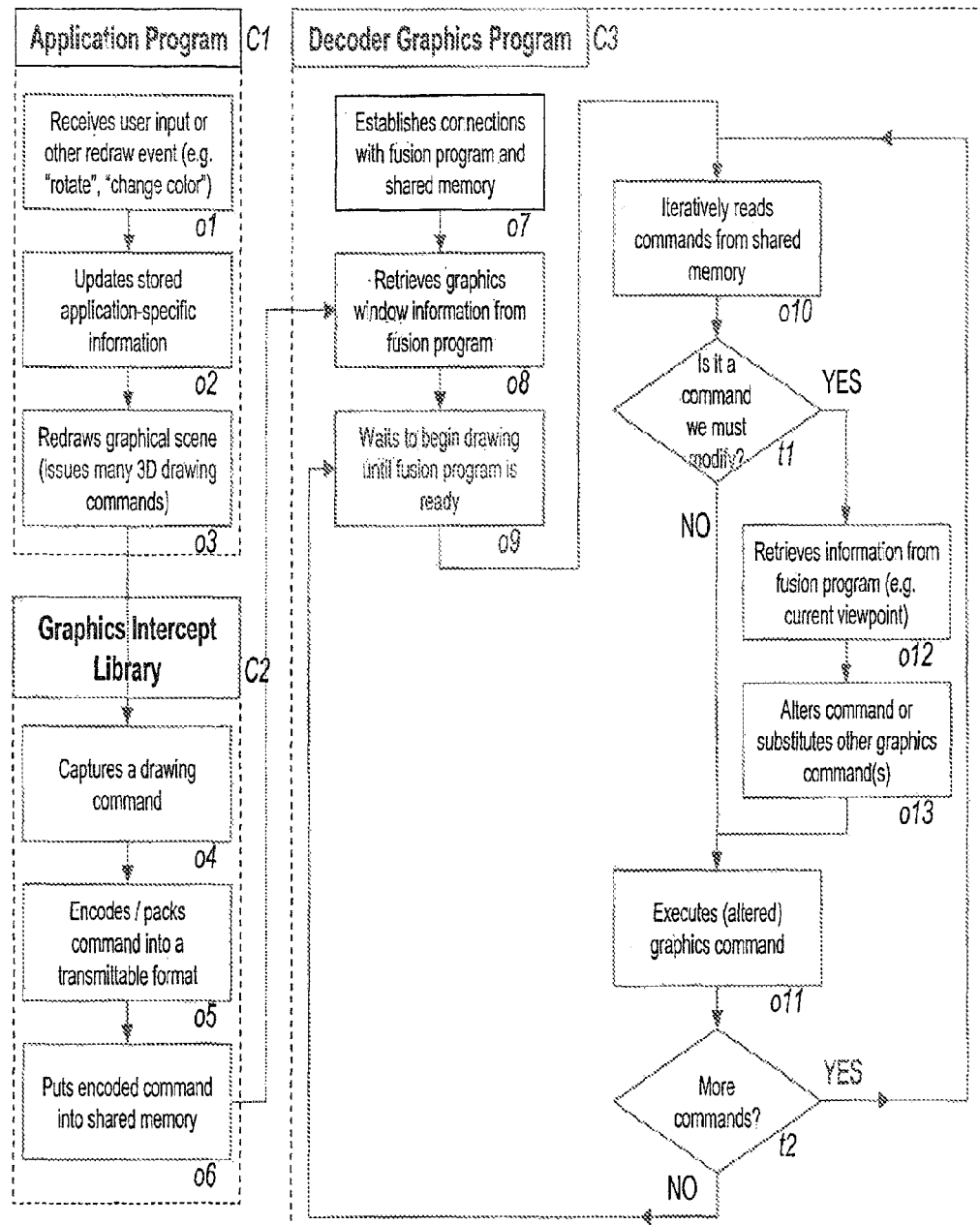
FIG. 7 illustrates the graphics processing operations for the embodiment of FIG. 4.

FIG. 7 illustrates a flowchart of actions that occur in the embodiment of FIG. 4 as a result of human interaction in the source graphics application program. The result of these actions being a visual update in the fusion environment. Objects C1, C2, and C3 in the flowchart correspond to items 100, 115, and 117 in FIGS. 4 and 5.

(o1) First the source application C1 waits for and eventually receives an event from a user input device (e.g. a key is pressed on the keyboard). (o2) The application may update some internal information, such as the position of a 3D object or its color. (o3) This causes the application to issue new drawing commands to update the visual appearance of the 3D object. (o4) Now the graphics intercept library C2 captures the application's drawing commands, and (o5) encodes or packs the commands into a transmittable format before (o6) placing them in shared memory. Now any process C3 can decode and draw C1's 3D commands that C2 stored in shared memory, provided that it has (o7) established a connection to the fusion environment program, which draws the information on screen (in some embodiments, that may actually be process C3). After (o8) some further one-time setup procedures, a decoder process may begin to draw the graphics commands it reads from shared memory (o9) as the fusion environment program indicates that it is ready for the decoder to draw.

(o10) 3D objects and drawing commands are then drawn iteratively. After the first frame, whose special treatment FIG. 11 and its description cover more in depth, the decoder process makes a decision (t1) whether or not to alter the contents of the current drawing command based on its type. If the command must be modified, (o12) it retrieves information about the drawing state of the fusion environment and (o13) alters the command(s) accordingly before (o11) actually executing the drawing command. The decoding and drawing procedure is repeated until (t2) the last graphics command for the current animation frame has been read from the shared memory.

Figure 8:
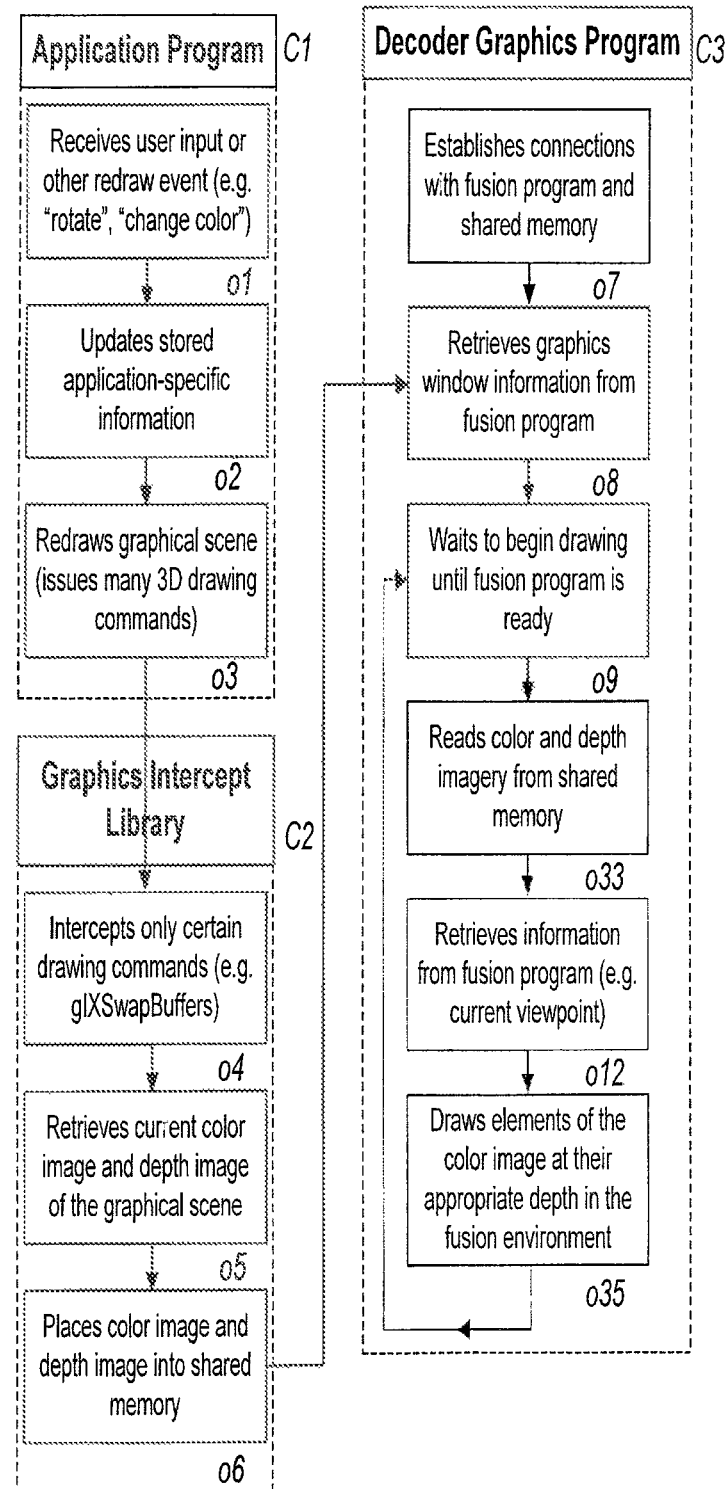
FIG. 8 illustrates the graphics processing operations for the alternate embodiment shown in FIG. 5.

FIG. 8 illustrates a flowchart of actions that occur in the embodiment of FIG. 5 as a result of human interaction in the source graphics application program. The result of these actions being a visual update in the fusion environment. Objects C1, C2, and C3 in the flowchart correspond to items 100, 115, and 117 in FIGS. 4 and 5. The flowchart in FIG. 8 is identical to FIG. 7 with the following three exceptions: (o33) the decoder process reads color and depth images instead of graphics commands out of shared memory; the decoder process always retrieves position and orientation information from the fusion program; and (o35) the decoder process is responsible for drawing the color and depth imagery in an appropriate way and at the appropriate depth in the scene of the fusion program.

Figure 9:
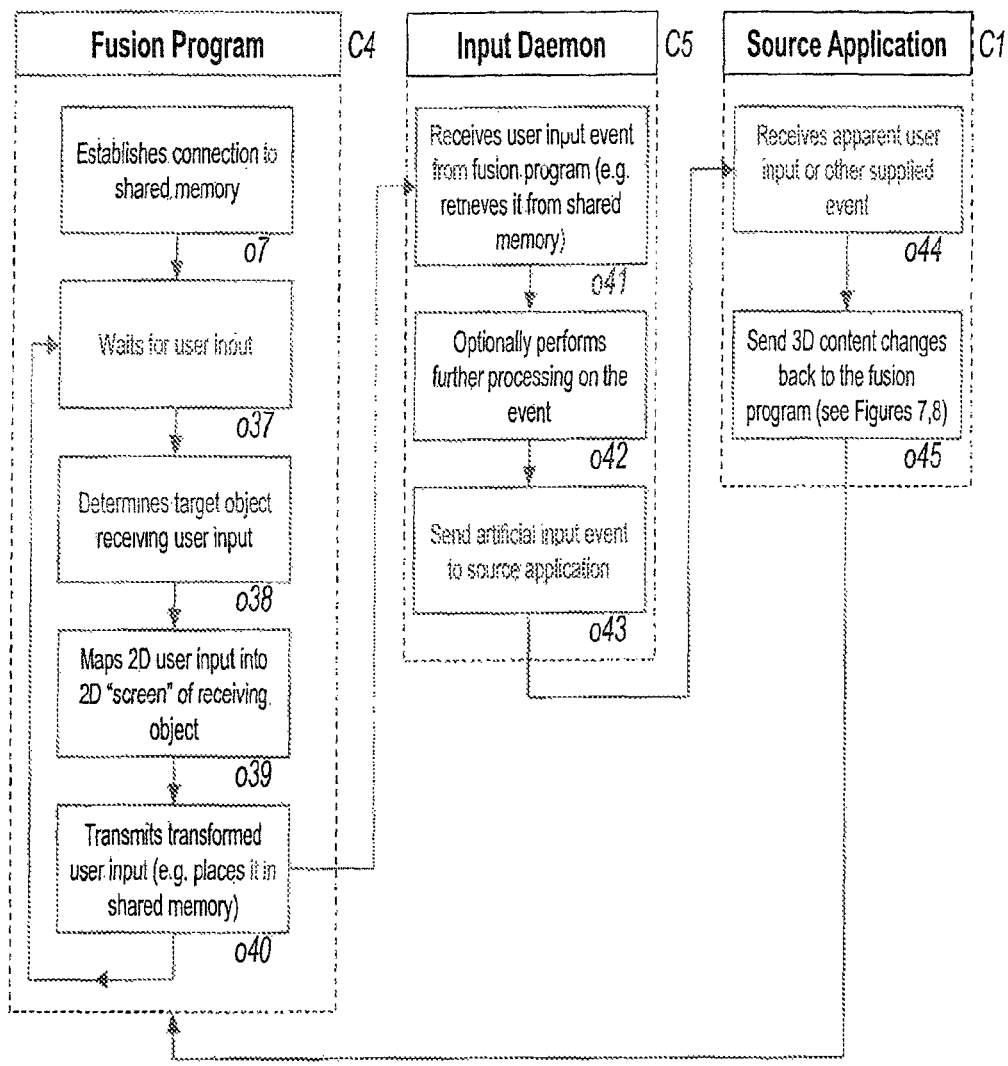
FIG. 9 illustrates input processing operations when they come from the fusion application and propagated to the source application.

The previous process describes the way that user input events on the source application are propagated implicitly to the fusion application via the changes in the 3D content carried by the 3D stream. FIG. 9 describes another user input mechanism, this time when it comes from within the fusion application, and is propagated to the source application, so that in the end it influences the 3D data stream and content in both the source and fusion applications.

The flowchart in FIG. 9 diagrams the chain of events triggered by a user interaction in the fusion environment program that are eventually propagated explicitly back to the graphics data source application. We're supposing that the fusion application has a graphic user interface that allows determining that the target of received user events is actually the fused 3D content coming from the source application. In such case, since the 3D content of the source application is drawn in the context of the fusion program, input events (o37) must be reverse-mapped (o38, o39) back to the context of the source application. For example, the 3D content from the source application may be applied some transformation by the fusion program, like a rotation, in which case the mouse input events must be projected back to the original coordinate system of the source application, so to be sent back (o40) to the source application in the right context. Input events received (o41) within the fusion program, and mapped to the source application's context, may have applied farther processing (o42) before being sent (o43) to the input program, so that although they are fake events from the source application's standpoint, they will be handled as real ones as if they would have come from direct user interaction on the source application. Finally, the source application will handle (o44) those fake user events as real ones, which will cause changes in the 3D content, and these changes will be sent back (o45) to the fusion program, as described in FIGS. 7 and 8. From the fusion program user's viewpoint, he's directly interacting with the 3D content of the source application.

The fusion environment is capable of presenting the data of a source application in one of three modes: 1.) 2D mode, 2.) Partial 3D mode, and 3.) Full 3D mode. Referring to FIGS. 4 and 5, in mode 1 only the captured image stream e1 produced by the graphics hardware 106 is displayed in a 2D window suspended in the 3D fusion environment. In mode 2, the captured color and depth images of the source graphics application are combined and redrawn in the fusion environment to produce the same image as in mode 1, but with added 3D "relief" from the stream of depth imagery, capable of providing novel views of the object. In mode 3, the application's 3D graphics data itself is captured and displayed as a true 3D object in the fusion environment.

Figure 10:
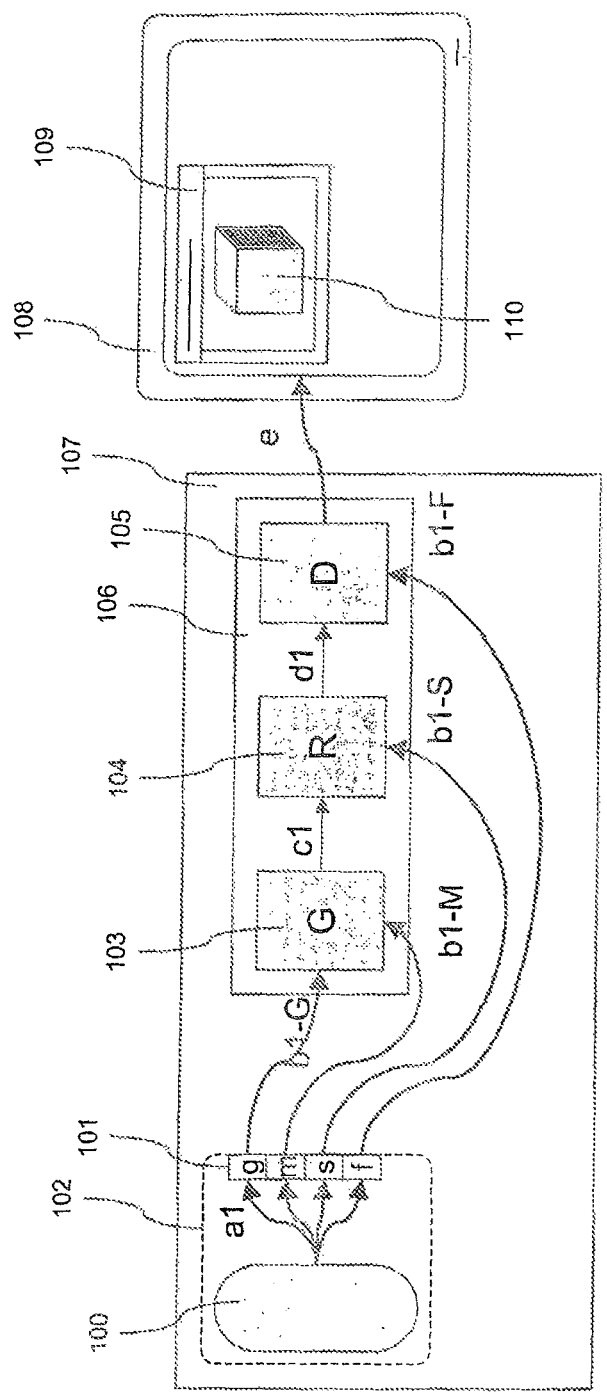
FIG. 10 illustrates the internal structure of the Graphics Device in FIG. 1 and serves as an introduction background for the two next figures.
Figure 11:
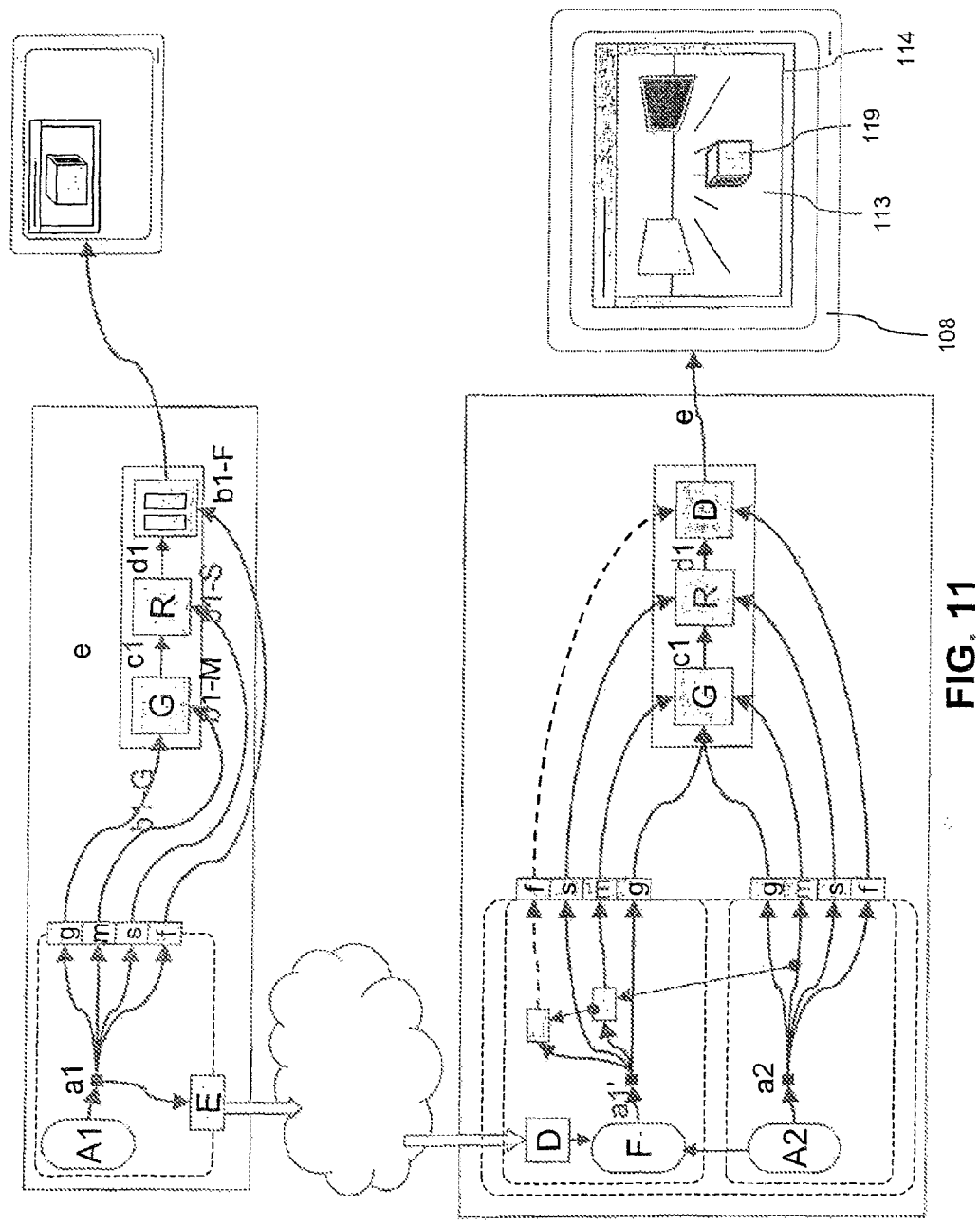
FIG. 11 is a more detailed view of FIG. 4, based on the internal structure of the Graphics Device as described in FIG. 10.
Figure 12:
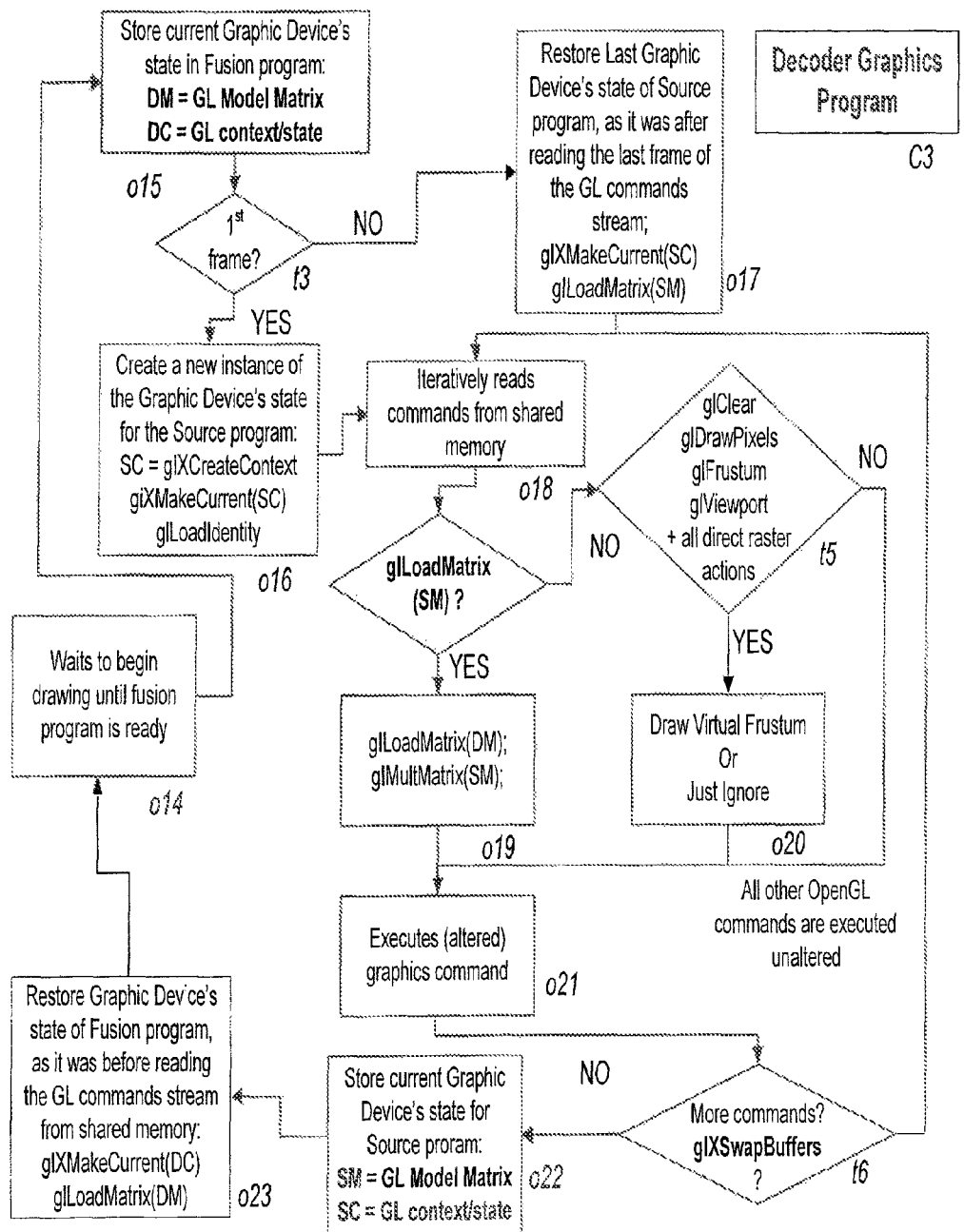
FIG. 12 shows the algorithm that drives the alteration of Graphic commands based on the example of real OpenGL calls and is a more detailed version of FIG. 7.

FIGS. 10, 11, and 12 explain the actions on the 3D commands that enable the fusion of source applications' 3D data into the destination application.

The implementation of the 3D fusion depends on the internal architecture of the Graphics Device. Graphics devices can be classified into two categories: the scene graph based devices, and the buffer-based devices. The first category, scene-graph based, includes Raytracers and Radiosity processors, and is based on a an internal copy of the scene graph, i.e. a full tree-like database of all the geometry of the scene, where the 3D commands are actually explicit updates on the scene graph. The second category, buffer-based, includes most of the Accelerated Graphics hardware sold in the market (Nvidia, ATI, etc.), and is based on processing a flow of geometric primitives that are transformed into pixels and accumulated into buffers.

When the Graphics device is based on a scene graph, the fusion is straightforward, as it just implies encoding the scene tree of the source application, and decoding it in the destination program before adding a branch in the target scene tree with the sub-scene tree of the source application.

The buffer-based Graphics engine is less straightforward, as there is no global knowledge of the scene within the device. In the following sections, we're detailing the process of 3D fusion in this kind of Graphics Devices.

FIG. 10 provides a more detailed view of the Graphics Device's black box, in the buffer-based case. We should understand the graphics device has a pipeline of state machines acting as filters that transform geometric primitives into a video signal. The Geometry Engine 103 transforms and projects the flow b1 of geometric primitives (vertices, triangles, normals, etc) into the coordinate system of the window, by "filtering" them via a transformation matrix stack. Then, each transformed, projected polygon in stream c1 is rasterized into a pixilated representation called a fragment by a Raster Engine, or Fragment Processor 104. The stream of pixel fragments d1 is then accumulated in the video frame buffer of a Display Engine, or Display Generator 105. At periodic intervals, typically every 60th of a second, the display generator 106 generates a video signal e from the pixels in its video frame buffer containing the transformed and rasterized representation 110 of the program's graphics commands a1 placed in a window 109 on computer display 108 which is connected to computer 107.

More specifically, the stream of graphics commands a1 from the application, and likewise the set of hardware-specific graphics commands b1 from the graphics library, can be subdivided into 4 types of actions on the graphics pipeline, depending on what part of the Graphics Device they're acting on. The first set of commands, b1-G, contains the geometry and other graphics primitives (vertices, polygons, normals, texture mapping coordinates, etc.). These are pushed to the front of the pipeline. The second set, b1-M, operates on the Geometry Engine's state, typically on the internal transformation matrix stack applied to every geometric primitive. The third, b1-S, operates on the Fragment Processor's state (color, material, textures). And the last ones, b1-F, are direct operations on the video frame buffer, including clearing the buffer, drawing an image directly as pixels.

FIG. 11 illustrates the technique used to integrate the Graphic content of an application into another one. It is a more detailed version of FIG. 4, the detail being based on the internal structure of the Graphic Device as illustrated in FIG. 10. The Graphic Device used by the fusion program basically mixes two contexts of graphic command: one from the fusion scene, and the second from the Graphics commands received from the originating application, and decoded locally. The Graphic commands are redirected differently depending of which category, as detailed in FIG. 10, they belong to. Basically, from the original stream, only the matrix operations, and the direct actions on the video frame buffers, are "altered" before being sent to the Graphics Device. Others are sent unaltered. The alteration is mostly based on the current transformation matrix of the fusion program at the moment when it starts processing the Graphics commands stream.

FIG. 12 provides additional relative to FIG. 7, i.e. the alteration of commands. It is illustrated with the example of C functions of the OpenGL library, but it is easily generalizable to other APIs like Microsoft's DirectX. Whenever the fusion program's draw thread is ready (o14) to read a frame of the OpenGL commands stream from the source application, it first stores (o15) the full current state of the Graphics device. Then, depending on whether this is or not the first time (t3) the fusion program processes a frame of the 3D commands stream, it will respectively (o16) create or restore (o17) another instance of the Graphics device state, reserved for the source application's 3D commands stream. When processing each of the 3D commands (o18), the commands that will be altered (t4) are typically the non-incremental, non projective operations on the transformation matrix of the Geometry Engine (namely glLoadMatrix* and glLoadIdentity when applied to the OpenGL's model matrix, but (t5) not glFrustum nor glOrtho), and the raster operations that directly modify the target color and depth buffers (namely glClear, glScissor, glDrawPixels, glViewport, etc.). The matrix load operations are replaced (o19) with loading the destination's transformation matrix before the current frame of the shared 3D commands was started to be read, composed with the loaded matrix of the source application. This small alteration is actually doing the 3D fusion, by integration the 3D content of the source application within the 3D coordinate system of the destination 3D world. Projection operations should be ignored, as they are irrelevant in the fusion program, and they would just corrupt its projection algorithm on the target window. Regarding raster operations, coming from the 3D commands stream, they should be simply ignored, to avoid corrupting the color and depth buffer of the fusion program. Another option is to use those commands, together with projection commands, to draw (o20) a "virtual frustum" that represents the projection observed by the source application. The end of the commands for the current video frame is detected (t6) either by a break in the flow of commands from the shared stream, or by a command that explicitly terminates the drawing for this video frame (namely glXSwapBuffers in the case of a double color buffer in the graphic device). Once all the commands for the video frame have been processed, we should store (o22) the current state as the source application's state, as known as the graphic state of the 3D commands stream. Then, we restore (o23) the fusion program's graphic device state, so that it could continue processing the geometry of its local 3D virtual world.

For more information regarding the process of manipulating OpenGL matrices for the purpose of correcting the orientation or appearance of 3D objects without modifying the code of an application, the reader may refer to U.S. Pat. No. 6,982,682, which utilizes a similar OpenGL matrix manipulation process for correcting images drawn onto curved surfaces.

In addition to manipulating graphics commands related to geometry transformation, other graphics commands may be altered, added, or removed to improve the integration of a foreign graphics stream into the fusion environment. This includes, for example, commands that affect lighting, raster (2D) drawing, textures and other surface material properties, vertex programs, fragment shaders, and the recording and playback of command macros known as display lists.

Figure 13:
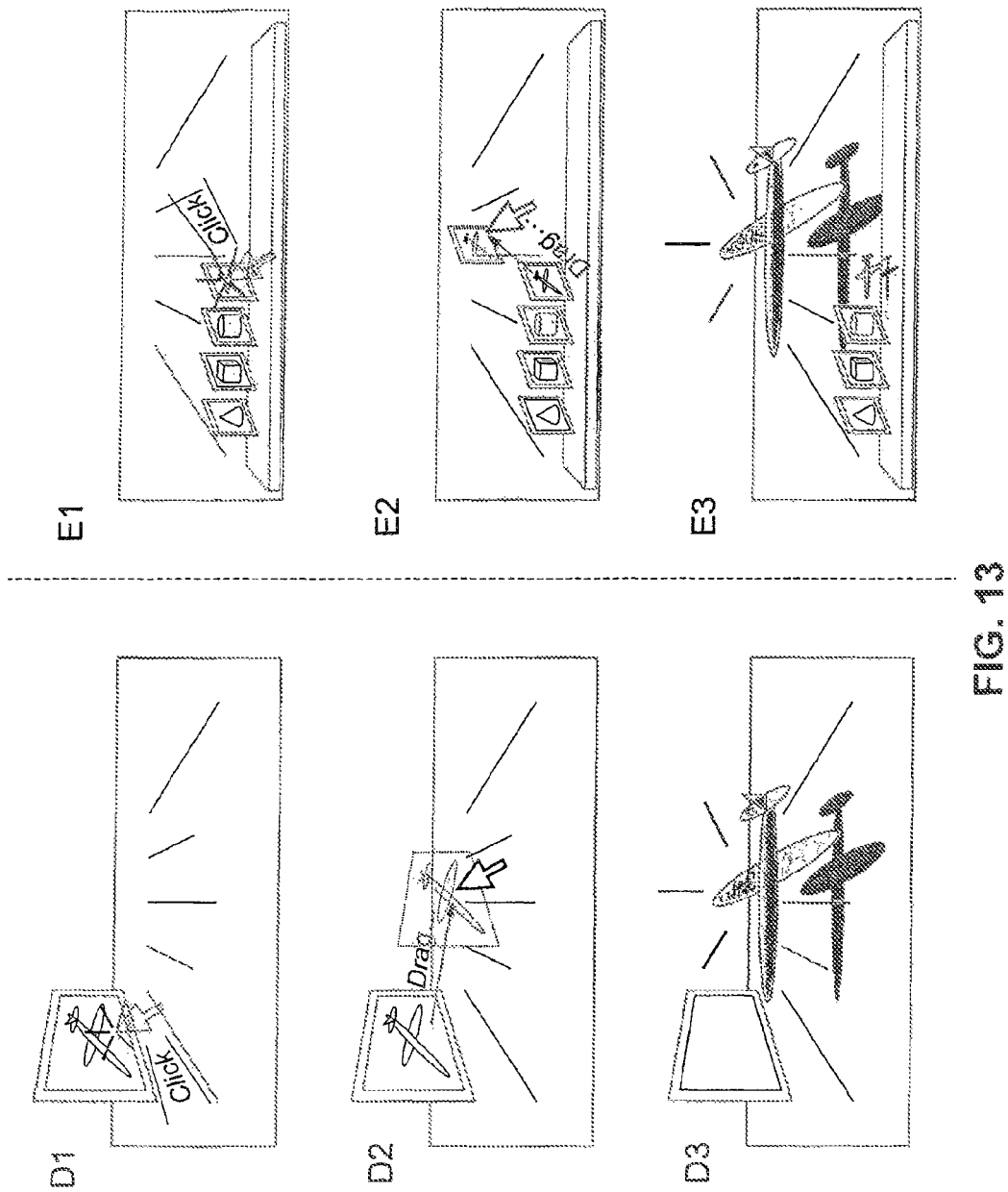
FIG. 13 shows some methods by which a user can transition from 2D to 3D representations of their application's graphics data.

The diagrams in FIG. 13 show that to transition between these three modes of operation, a user may utilize menus, buttons, or other user interface elements or techniques, including a method of dragging and dropping a 2D object or icon into a fusion environment to begin to display the stream of 3D data. For example, the user may drag D1-D3 into the fusion environment an icon of an application or stream he wishes to initiate, or he may drag E1-E3 the contents of a 2D window into the 3D scene of the fusion environment to switch from mode 1 (2D window) to modes 2 or 3 (partial or full 3D window).

An implementation that supports such a 2D to full 3D transition (from mode 1 to mode 3) must include the ability to retrieve on demand or track and record the changes to important graphics state values in the source application such as transformation matrices, lighting modes, current color information, and many other graphics state parameters. Even if the application is only represented as a 2D picture, these states must be tracked from the moment the source application begins making drawing commands in case the user decides at a later time to transition from a mode 1 window to a mode 3 "3D window". Otherwise the source application must temporarily suspend graphics operations and incur an expensive retrieval of graphics state information for the decoder process or fusion environment to begin drawing the remote application's graphics commands.

An implementation that supports a 2D to partial 3D transition (from mode 1 to mode 2) does not need to perform any graphics state tracking or retrieval. It is therefore more convenient to create an implementation that converts from 2D to partial 3D in this way, but such an implementation places limits on the motion of the user's viewpoint without forcing the source application to redraw the image as the viewpoint changes.

Figure 14:
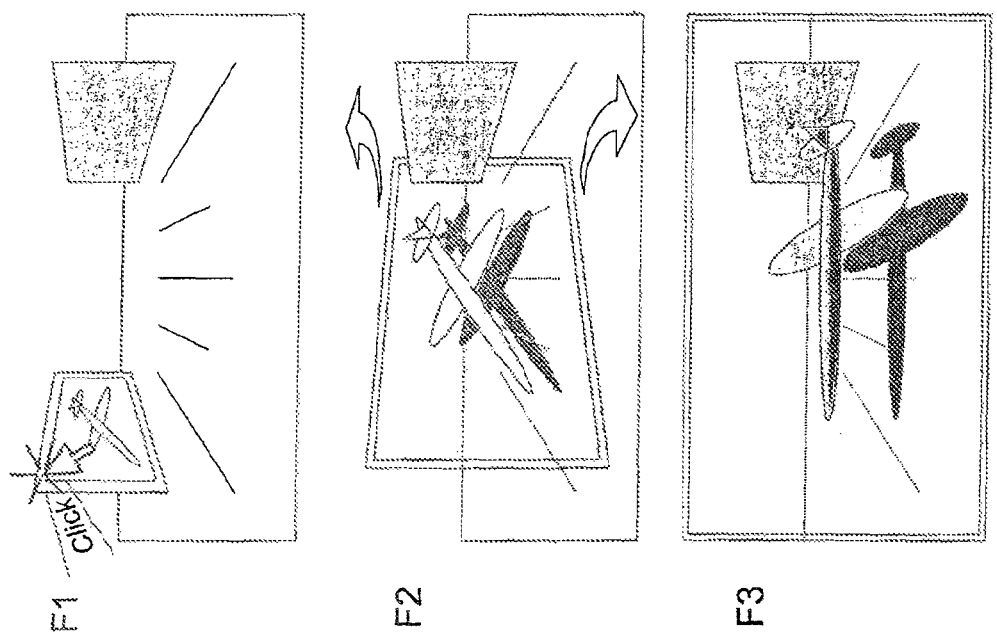
FIGS. 14 and 15 show dragging and drooping in the environment.

FIG. 14 shows a method by which the user may utilize menus, buttons, or other user interface elements or techniques, including a drag and drop F1-F3 methodology to initiate a mode where the 3D application stream fills the entire 3D space of the fusion environment, similar to the way a modern 2D computer application may have a "full screen" mode in which its 2D window covers other windows on the screen and takes over the entire computer screen. Some elements of the user's environment may remain visible while other interface elements become obscured when the application fills the fusion environment.

Figure 15:
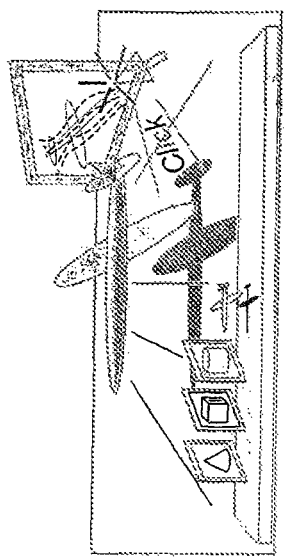
Figure 15:
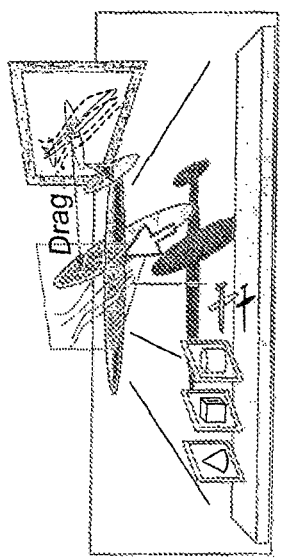
Figure 15:
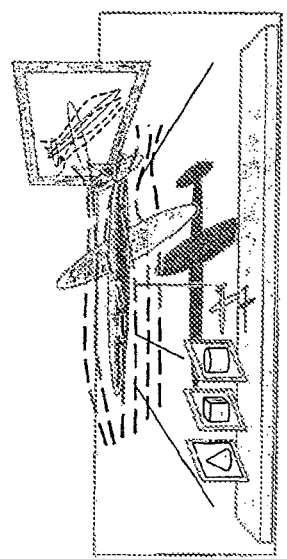

FIG. 15 shows a method by which the user may utilize menus, buttons, or other user interface elements or techniques, including a drag and drop methodology to initiate a mode where the content is dragged G1-G3 into the 3D space of the fusion environment, similar to the way a modern 2D computer application may have a "full screen" mode in which its 2D window covers other windows on the screen and takes over the entire computer screen. Some elements of the user's environment may remain visible while other interface elements become obscured when the application fills the fusion environment.

Other variations of the invention can be provided include the ability to replicate and distribute the captured streams via a form of broadcast function. Also, the ability to use captured streams as sources for some form of function, i.e. looking for interference, by doing a difference, construction via addition or even some algorithmic process applied to the input streams to create a derivative. Another aspect is the ability to use this to record states of development, for example, where this capture process can create a permanent record of different phases of a project by capturing and putting to storage. This may be used by capturing versions from a number of users at a particular point in time and keeping this as a snapshot for later review or audit. Another element to consider is the provision of a repository for common parts that can generated once and then shared with remote users. Another aspect is shared collaboration where data is captured via a fusion server and then made available to individuals or collaborators to work on jointly.

Fused content from the fusion environment may be fed back into the original source application as mentioned previously. This is so all applications supplying 3D objects into the fusion environment will see in their 3D scenes, the 3D objects supplied by all the other applications. Essentially, every participating application can also become a fusion environment, This facilitates remote collaboration.

With or without user assistance, meaningful "slices" of an OpenGL stream may be selectively extracted and drawn in the fusion environment, where a "slice" could be of time or of space. This capability could be manifested as a cutaway view, "3D screen capture", or 3D movie recorder. Some of these 3D slicing capabilities may be found in the software HijackGL, created by The University of Wisconsin-Madison.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   intercepting, by an intercept module, buffer-based architecture three-dimensional (3D) imagery produced by a first application, wherein the 3D imagery is not provided by the first application for consumption by the intercept module;
   extracting a two-dimensional (2D) imagery, color imagery and depth imagery from the intercepted 3D imagery;
   combining the 2D imagery, the color imagery and the depth imagery with a 3D graphics command stream of a second application to drive display hardware in order to integrate a 3D object based on the two-dimensional (2D) imagery, the color imagery and the depth imagery into a 3D scene, using a same 3D coordinate system of the 3D scene, based on the 3D graphics command stream of the second application, wherein the 3D scene is independent of the first application, wherein the combining further comprises modifying the 2D imagery, the color imagery and the depth imagery in order to visually integrate the 3D object into the 3D scene.

2. The method as recited in claim 1, further comprising producing an integrated 3D scene comprising the integrated 3D object and the 3D scene generated from the 2D imagery, the color imagery and the depth imagery in the display hardware.

3. The method as recited in claim 1, wherein the modifying comprises correlating 3D coordinate systems and scene lighting of the 3D object and the 3D scene.

4. The method as recited in claim 1, wherein the modifying comprises correlating visual effects of the 3D object and the 3D scene.

5. The method as recited in claim 1, further comprising driving a same graphics accelerator hardware with the 2D imagery, the color imagery and the depth imagery and the 3D graphics command stream.

6. The method as recited in claim 1, further comprising driving another display hardware with the 2D imagery, the color imagery and the depth imagery.

7. The method as recited in claim 1, further comprising storing the 2D imagery, the color imagery and the depth imagery in a memory that is shared among different processing threads, or distributed over the network between several computer hosts.

8. The method as recited in claim 1, further comprising transforming data of the 2D imagery, the color imagery and the depth imagery from a first application data type to a second application data type.

9. The method as recited in claim 1, further comprising creating a 3D media fusion environment at the second application.

10. The method as recited in claim 1, wherein the intercepting comprises copying function calls arriving at call entry points of the first application.

11. The method as recited in claim 10, wherein the combining further comprises passing the copied function calls to entry points of the second application.

12. The method as recited in claim 11, wherein the combining further comprises modifying the passed function responsive to a 3D fusion environment.

13. A system, comprising:
   graphics hardware configured to produce display signals;
   a display configured to produce an image using the display signals;
   a shared memory; and a computer comprising:
- a three-dimensional (3D) graphics process configured to generate buffer-based architecture 3D graphics imagery;
- an intercept process configured to extract a two-dimensional (2D) graphics imagery, color imagery and depth imagery from the 3D graphics imagery produced by the 3D graphics process and, wherein the 3D graphics imagery is not provided by the 3D graphics process for consumption by the intercept process, and storing the 2D graphics imagery, the color imagery and the depth imagery in the shared memory;
- a 3D environment process configured to generate a 3D graphics command stream for a 3D fusion environment and supply the 3D graphics command stream to the graphics hardware;
- an integration process configured to integrate a 3D object based on the stored 2D graphics imagery, the color imagery and the depth imagery into the 3D fusion environment, using a same 3D coordinate system of the 3D fusion environment, based on the 3D graphics command stream of the second application, wherein the 3D fusion environment is independent of the 3D graphics process, wherein the integration process is further configured to modify the 2D imagery, the color imagery and the depth imagery in order to visually integrate the 3D object into the 3D fusion environment.

14. The system as recited in claim 13, further comprising:
second graphics hardware receiving the 2D imagery, the color imagery and the depth imagery; and
a second display producing a display for the 2D imagery, the color imagery and the depth imagery.

15. The system of claim 13, the computer further comprising a mapping process configured to map inputs to the 3D fusion environment to the 3D graphics process and the 3D environment process.

16. A display, comprising:
- a three-dimensional (3D) fusion display environment displayed in a window, independent of a first process, created by a buffer-based architecture 3D graphics command stream generated by a second process;
- a 3D object created by two-dimensional (2D) graphics imagery, color imagery and depth imagery generated from 3D graphics imagery generated by a first process, intercepted by an intercept module, and integrated into the 3D fusion display environment, using a same 3D coordinate system of the 3D fusion display environment, wherein the 2D graphics imagery, the color imagery and the depth imagery are not provided by the first process for consumption by the intercept module, wherein the combining further comprises modifying the 2D imagery, the color imagery and the depth imagery in order to visually integrate the 3D object into the 3D fusion display environment; and
- display hardware configured to display the integrated 3D fusion display environment.

17. The display as recited in claim 16, wherein data can be dragged and dropped into the window.

18. The display as recited in claim 16, wherein transparent collaboration on the 3D object and the 3D fusion display environment displayed in the window can be performed without altering or recompiling source code of a source application.

19. A non-transitory computer-readable medium having stored thereon computer-executable instructions that, if executed by a computing device, cause the computing device to perform a method comprising:
- intercepting, by an intercept module, buffer-based architecture three-dimensional (3D) imagery produced by a first application, wherein the 3D imagery is not provided by the first application for consumption by the intercept module;
- extracting a two-dimensional (2D) imagery, the color imagery and the depth imagery from the intercepted 3D imagery;
- combining the 2D imagery, color imagery and depth imagery with a 3D graphics command stream of a second application to drive display hardware in order to integrate a 3D object based on the two-dimensional (2D) imagery, the color imagery and the depth imagery into a 3D scene, using a same 3D coordinate system of the 3D scene, based on the 3D graphics command stream of the second application, wherein the 3D scene is independent of the first application, wherein the combining further comprises modifying the 2D imagery, the color imagery and the depth imagery in order to visually integrate the 3D object into the 3D scene.

* * * * *